United States Patent [19]
Balster et al.

[11] Patent Number: 6,038,487
[45] Date of Patent: Mar. 14, 2000

[54] CROSS DIRECTION WEB PROCESSOR

[75] Inventors: Lester A. Balster, Appleton; Charles J. Pingel, Little Chute; Jeffrey L. Wells, Appleton, all of Wis.

[73] Assignee: Appleton Papers Inc., Wis.

[21] Appl. No.: 08/867,119

[22] Filed: Jun. 5, 1997

[51] Int. Cl.$^7$ ...................................................... G06F 19/00
[52] U.S. Cl. .......................... 700/122; 700/117; 700/166; 219/121.72
[58] Field of Search .................. 364/471.01, 469.01, 364/468.24, 474.08; 219/121.67, 121.72; 430/945

[56] References Cited

U.S. PATENT DOCUMENTS

| | | |
|---|---|---|
| 3,226,527 | 12/1965 | Harding . |
| 3,790,744 | 2/1974 | Bowen . |
| 3,909,582 | 9/1975 | Bowen . |
| 4,265,254 | 5/1981 | Koch et al. ............................... 131/281 |
| 4,297,559 | 10/1981 | Whitman, III .................... 219/121.032 |
| 4,410,785 | 10/1983 | Lilly, Jr. et al. ................... 219/121 LK |
| 4,446,187 | 5/1984 | Eklund ..................................... 478/136 |
| 4,569,359 | 2/1986 | Nowers et al. ........................... 131/281 |
| 4,843,207 | 6/1989 | Urbanek et al. ...................... 219/121.6 |
| 4,906,605 | 3/1990 | Kraft ....................................... 503/215 |
| 5,225,649 | 7/1993 | Andreoli et al. .................... 219/121.67 |
| 5,444,035 | 8/1995 | Perrington et al. ..................... 503/210 |
| 5,611,949 | 3/1997 | Snellman et al. ................... 219/121.67 |

FOREIGN PATENT DOCUMENTS

| | | |
|---|---|---|
| 0008161A1 | 2/1980 | European Pat. Off. . |
| 4023997A1 | 1/1992 | Germany . |
| 3222394A | 12/1993 | Germany . |
| 968824 | 8/1963 | United Kingdom . |
| 1442002 | 8/1974 | United Kingdom . |
| 2062576A | 5/1981 | United Kingdom . |
| WO9203250 | 3/1992 | WIPO . |

OTHER PUBLICATIONS

Laser Technology: Applications For Nonwovens and Composites, William E. Lawson, Technical Director Laser Machining, Inc., pp. 88–92.

Application of Laser Technology to the Processing of Nonwovens and Composites, William E. Lawson, Technical Director Laser Machining, Inc, Somerset, WI, pp. 1–11.

The laser in the paper mill–cutting, perforating or scoring by Paul Ratoff, Vice President, Hadron and Jerome E. Dennis, pp. 50–53.

Application of Laser Technology to the Processing of nonwovens and composites, William E. Lawson Technical Director Laser Machining, Inc., Somerset, WI, pp. 1–11.

Laser applications in the paper industry, by Paul Ratoff, Westbury, N.Y. pp. 128–130.

(List continued on next page.)

*Primary Examiner*—William Grant
*Assistant Examiner*—Chad Rapp
*Attorney, Agent, or Firm*—Birch, Stewart, Kolasch & Birch, LLP

[57] ABSTRACT

A web processor includes a support for supporting a movable web to form a concave trough along a path having a longitudinal axis. A rotatable element is provided which includes a beam redirecting device for redirecting an incident beam of radiation to produce a resultant beam directed substantially orthogonally to the axis of rotation of the rotatable element. The rotatable element includes at least one lens for focussing the resultant beam to produce a focus point on the path. The path is configured such that rotation of the rotatable element locates the focus point on a line non-parallel to the longitudinal axis of the concave trough. In a method for treating a web, a movable web is formed into a concave trough having a longitudinal axis. An incident beam of radiation is directed to a beam redirecting device on a rotatable element to produce a resultant beam of radiation directed substantially orthogonally to an axis of rotation of the rotatable element. The resultant beam is focussed to produce a focus point on the concave trough. The web is moved in a direction along the longitudinal axis while rotating the rotatable element to locate the focus point on a line across the web, with a path of travel of the focus point being non-parallel to the longitudinal axis of the concave trough. A web is scored, marked, perforated or cut by the above method.

36 Claims, 14 Drawing Sheets

OTHER PUBLICATIONS

Mitsubishi Denki Giho [Technical Report], vol. 63. No. 4. 1989, p. 12 (281) –22 (286), Special Report—New Application of Carbon Dioxide Gas, Hajime Kitani et al, Nagoya Manufacturing Office Production Technology Res. Lab., pp. 17–22, and 1–11.

$Co_2$ Lasers—Effects & Application W.W. Duley, 6.5 Cutting Nonmetals, pp. 267–268.

Laser Technology in Industry Hyperfine Interactions 37 (1987) 423–432, V.A. Katulin P.N. Lebedev Physical Inst, 443020 Kuibyshev, USSR.

Status Report on 250 Watt $Co_2$ Laser for Applications in the Pulp and Paper Inductry by C.H. Miller, Westinghous Electric Corp. Laser Systems Dept. Industrial Equip. Div. Sykesville, Md. 21784, May 7–10, 1969, pp. 1–33.

Everlase Laser Machine Tools, Coherent General, A Joint Venture Co. of Coherent, Inc. & General Electric Co., 1984, pp. 1–26.

Paperchem No; 61–11808 Copyright 1992 IPST Laser Cutting and Perforating of Filter Paper, Mommsen, J.; et al.

Lasers in Industry, Francis P. Gagliano et al Member, IEEE, Proceedings of the IEE, vol. 57, No. 2, Feb. 1969, pp. 114–147.

Proceedings of the Society of Photo–Optical Instrumentation Engineers, vol. 92, Practal Applications of Low Power Lasers, Aug. 26–27, 1976, San Diego, California, pp. 173–182.

Paper Cutting by $CO_2$, Laser by Nobuaki Hattori, et al (Faculty of Agriculture, Kyoto Univ. Kyoto) & Yukitak Nagano (Manuf. Eng. Lab. Tokyo Shibaura Elec. Co., Ltd., Kawasaki) pp. 33–39 & 1–14.

High–Resolution Pringting by Laser Addressing of Microencapsulated Dyes G. Mader and H. Meixner, G. King, Journal of Imaging Science, vol. 34, No. 5, Sep./Oct. 1990, pp. 213–216.

Lasers Karel Patek English CRC Press A Division of The Chemical Rubber Co., Cleveland, Ohio, International Scienticic Series, K. Patek 1964, pp. 5 & 238–249.

Low–Cost Laser Systems Can Replace Mechanical Equipment in Packaging Applications: Sealing, Cutting, Perforating & Marking By Laser Are All Feasible, by Mark B. Cummings Loakman Electro–Optics, Inc. 33502 Calle Aviador San Juan Capistrano, Ca 92675.

Copy Magazine Imaging and Reproduction Jul., 1990 vol. 10, No. 7, Michael T. Weidemann, Eastern Reg. Advertising Sales, pp.9–10 & 12.

Pulp 7 Papger vol. 47 No. 3, Mar. 1973, by Paul Ratoff, pp. 128–130.

Laser Technology: Applications for Nonwovens and Composites by William E. Lawson Technical Director Laser Machining, Inc. pp. 89–92.

The Effect of Laser Beam Cuts on the Strength of Paper Edges by Bernard Pineaux, A thesis submitted in partial fulfillment of the requirements for the degree of Master of Science in the School of Printing Management and Sciences in the College of Graphic Arts and Photography of the Rochester Institute of Technology, Feb. 1988, pp. iii–x & 1–58.

La DeCoupe Du Papier Au Rayon Laser, pp. 1–5 & 1–11.

Microscopic Observations of the Solid Products Deposited on the Edge of Papers by $CO_2$ Laser Cutting, Nobuaki Hattori et al, Mokuzai Gakkaishi vol. 34. No. 5, pp. 417–422 (1988) [(Original Article)].

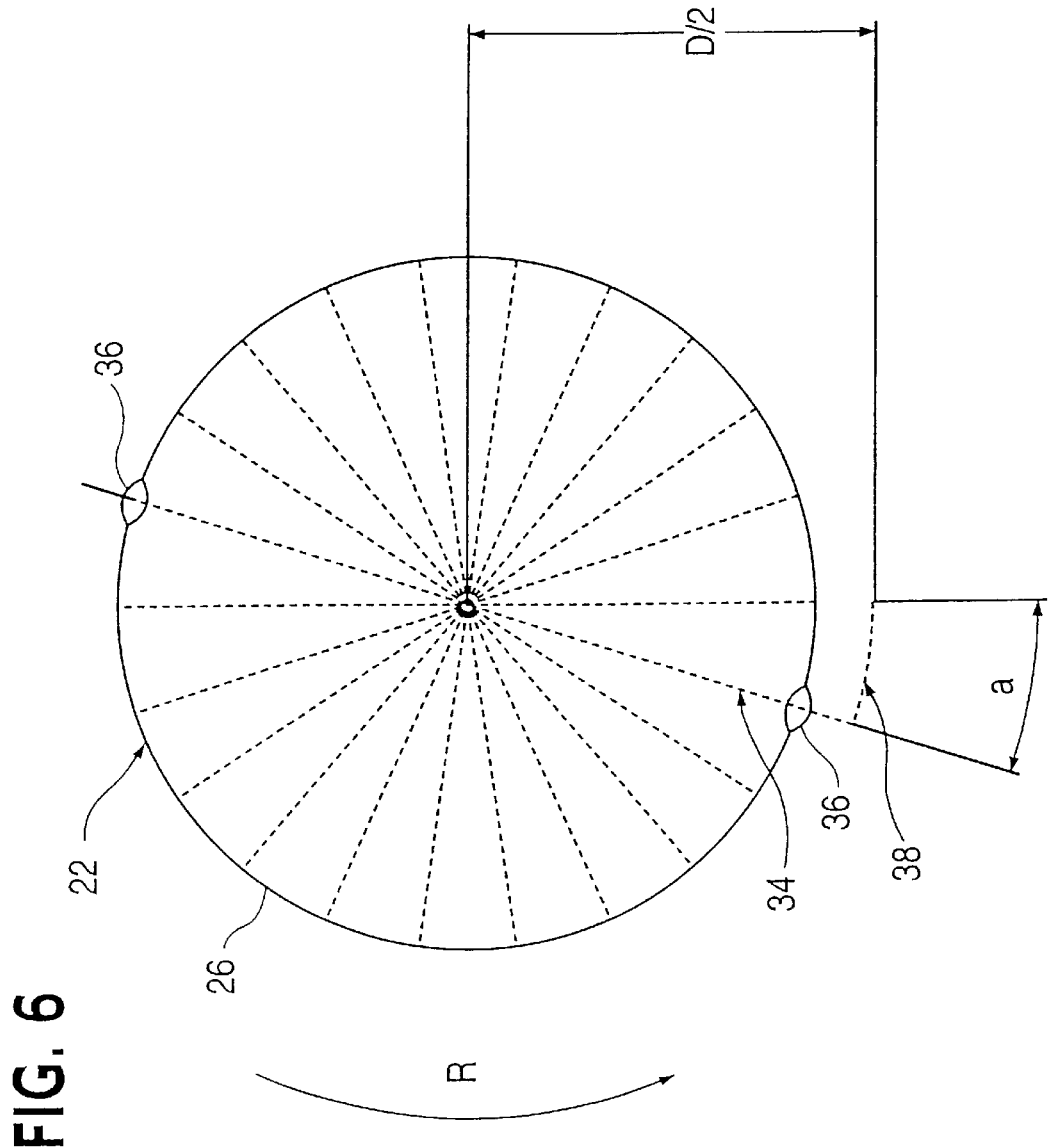

FIG. 9

| | | 100 | 200 | 300 | 400 |
|---|---|---|---|---|---|
| LINE SPEED OF PAPER - "V" (fpm) | | 100 | 200 | 300 | 400 |
| LENGTH OF PAPER - "L" (INCHES) | | 11 | 11 | 11 | 11 |
| WIDTH OF PAPER - "W" (INCHES) | | 8.5 | 8.5 | 8.5 | 8.5 |
| NUMBER OF LENSES - "N" | | 1 | 1 | 1 | 1 |
| INCREMENT BETWEEN CUTS - "I" (INCHES) | | 1.0 | 1.0 | 1.0 | 1.0 |
| P=Pi (3.14159) | | 3.14159 | 3.1416 | 3.1416 | 3.1416 |
| | | | | | |
| MOUNTED ANGLE - "B" = arctan(I/W) (DEGREES) | | 6.71 | 6.71 | 6.71 | 6.71 |
| ARC LENGTH OF CUT - "a" = W/cosB (INCHES) | | 8.559 | 8.559 | 8.559 | 8.559 |
| DISC SPEED "R" = V*12/(L*N) (rpm) | | 109.09 | 218.18 | 327.27 | 436.36 |
| INCREMENTS PER CUT "i" = L/I | | 11 | 11 | 11 | 11 |
| DIAMETER OF DISC "D" = I*a*N/Pi (INCHES) | | 29.97 | 29.97 | 29.97 | 29.97 |
| TIP SPEED OF DISC "T" = D*R*Pi/12 (fpm) | | 855.86 | 1711.72 | 2567.59 | 3423.45 |
| DEGREES OF DISC TRAVEL PER INCREMENT - "d" (DEGREES) | | 32.73 | 32.73 | 32.73 | 32.73 |

FIG. 10

| | | | | |
|---|---|---|---|---|
| LINE SPEED OF PAPER - "V" (fpm) - | 100 | 200 | 300 | 400 |
| LENGTH OF PAPER - "L" (INCHES)- | 11 | 11 | 11 | 11 |
| WIDTH OF PAPER - "W" (INCHES)- | 8.5 | 8.5 | 8.5 | 8.5 |
| NUMBER OF LENSES - "N" | 3 | 3 | 3 | 3 |
| INCREMENT BETWEEN CUTS - "I" (INCHES) | 1.0 | 1.0 | 1.0 | 1.0 |
| P=Pi (3.14159) | 3.1416 | 3.1416 | 3.1416 | 3.1416 |
| | | | | |
| MOUNTED ANGLE - "B" = arctan(I/W) (DEGREES) | 6.71 | 6.71 | 6.71 | 6.71 |
| ARC LENGTH OF CUT - "a" = W/cosB (INCHES) | 8.559 | 8.559 | 8.559 | 8.559 |
| DISC SPEED "R" = V*12/(L*N) (rpm) | 36.36 | 72.73 | 109.09 | 145.45 |
| INCREMENTS PER CUT "I" = L/I | 11 | 11 | 11 | 11 |
| DIAMETER OF DISC "D" = I*a*N/Pi (INCHES) | 89.90 | 89.90 | 89.90 | 89.90 |
| TIP SPEED OF DISC "T" = D*R*Pi/12 (fpm) | 855.86 | 1711.72 | 2567.59 | 3423.45 |
| DEGREES OF DISC TRAVEL PER INCREMENT - "d" (DEGREES) | 10.91 | 10.91 | 10.91 | 10.91 |

FIG. 11

| | | 100 | 200 | 300 | 400 |
|---|---|---|---|---|---|
| LINE SPEED OF PAPER - "V" (fpm) - | | | | | |
| LENGTH OF PAPER - "L" (INCHES)- | | 11 | 11 | 11 | 11 |
| WIDTH OF PAPER - "W" (INCHES)- | | 8.5 | 8.5 | 8.5 | 8.5 |
| NUMBER OF LENSES - "N" | | 2 | 2 | 2 | 2 |
| INCREMENT BETWEEN CUTS - "I" (INCHES) | | 1.0 | 1.0 | 1.0 | 1.0 |
| P=Pi (3.14159) | | 3.1416 | 3.1416 | 3.1416 | 3.1416 |
| | | | | | |
| MOUNTED ANGLE - "B" = arctan(I/W) (DEGREES) | | 6.71 | 6.71 | 6.71 | 6.71 |
| ARC LENGTH OF CUT - "a" = W/cosB (INCHES) | | 8.559 | 8.559 | 8.559 | 8.559 |
| DISC SPEED "R" = V*12/(L*N) (rpm) | | 54.55 | 109.09 | 163.64 | 218.18 |
| INCREMENTS PER CUT "i" = L/I | | 11 | 11 | 11 | 11 |
| DIAMETER OF DISC "D" = I*a*N/Pi (INCHES) | | 59.93 | 59.93 | 59.93 | 59.93 |
| TIP SPEED OF DISC "T" = D*R*Pi/12 (fpm) | | 855.86 | 1711.72 | 2567.59 | 3423.45 |
| DEGREES OF DISC TRAVEL PER INCREMENT - "d" (DEGREES) | | 16.36 | 16.36 | 16.36 | 16.36 |

FIG. 12

| | | | | |
|---|---|---|---|---|
| LINE SPEED OF PAPER - "V" (fpm) - | 100 | 200 | 300 | 400 |
| LENGTH OF PAPER - "L" (INCHES)- | 11 | 11 | 11 | 11 |
| WIDTH OF PAPER - "W" (INCHES)- | 8.5 | 8.5 | 8.5 | 8.5 |
| NUMBER OF LENSES - "N" | 1 | 1 | 1 | 1 |
| INCREMENT BETWEEN CUTS - "I" (INCHES) | 3.7 | 3.7 | 3.7 | 3.7 |
| P=Pi (3.14159) | 3.1416 | 3.14159 | 3.14159 | 3.14159 |
| | | | | |
| MOUNTED ANGLE - "B" = arctan(I/W) (DEGREES) | 23.33 | 23.33 | 23.33 | 23.33 |
| ARC LENGTH OF CUT - "a" = W/cosB (INCHES) | 9.257 | 9.257 | 9.257 | 9.257 |
| DISC SPEED "R" = V*12/(L*N) (rpm) | 109.09 | 218.18 | 327.27 | 436.36 |
| INCREMENTS PER CUT "i" = L/I | 3 | 3 | 3 | 3 |
| DIAMETER OF DISC "D" = I*a*N/Pi (INCHES) | 8.84 | 8.84 | 8.84 | 8.84 |
| TIP SPEED OF DISC "T" = D*R*Pi/12 (fpm) | 252.47 | 504.93 | 757.40 | 1009.87 |
| DEGREES OF DISC TRAVEL PER INCREMENT - "d" (DEGREES) | 120.00 | 120.00 | 120.00 | 120.00 |

FIG. 13

| | | | | |
|---|---|---|---|---|
| LINE SPEED OF PAPER - "V" (fpm) - | 100 | 200 | 300 | 400 |
| LENGTH OF PAPER - "L" (INCHES)- | 11 | 11 | 11 | 11 |
| WIDTH OF PAPER - "W" (INCHES)- | 8.5 | 8.5 | 8.5 | 8.5 |
| NUMBER OF LENSES - "N" | 1 | 1 | 1 | 1 |
| INCREMENT BETWEEN CUTS - "I" (INCHES) | 11.0 | 11.0 | 11.0 | 11.0 |
| P=Pi (3.14159) | 3.1416 | 3.1416 | 3.1416 | 3.1416 |
| | | | | |
| MOUNTED ANGLE - "B" = arctan(I/W) (DEGREES) | 52.31 | 52.31 | 52.31 | 52.31 |
| ARC LENGTH OF CUT - "a" = W/cosB (INCHES) | 13.901 | 13.901 | 13.901 | 13.901 |
| DISC SPEED "R" = V*12/(L*N) (rpm) | 109.09 | 218.18 | 327.27 | 436.36 |
| INCREMENTS PER CUT "I" = L/I | 1 | 1 | 1 | 1 |
| DIAMETER OF DISC "D" = I*a*N/Pi (INCHES) | 4.42 | 4.42 | 4.42 | 4.42 |
| TIP SPEED OF DISC "T" = D*R*Pi/12 (fpm) | 126.38 | 252.75 | 379.13 | 505.51 |
| DEGREES OF DISC TRAVEL PER INCREMENT - "d" (DEGREES) | 360.00 | 360.00 | 360.00 | 360.00 |

FIG. 14

| | | 100 | 200 | 300 | 400 |
|---|---|---|---|---|---|
| LINE SPEED OF PAPER - "V" (fpm) - | | | | | |
| LENGTH OF PAPER - "L" (INCHES)- | | 11 | 11 | 11 | 11 |
| WIDTH OF PAPER - "W" (INCHES)- | | 8.5 | 8.5 | 8.5 | 8.5 |
| NUMBER OF LENSES - "N" | | 3 | 3 | 3 | 3 |
| INCREMENT BETWEEN CUTS - "I" (INCHES) | | 11.0 | 11.0 | 11.0 | 11.0 |
| P=Pi (3.14159) | | 3.1416 | 3.1416 | 3.1416 | 3.1416 |
| | | | | | |
| MOUNTED ANGLE - "B" = arctan(I/W) (DEGREES) | | 52.31 | 52.31 | 52.31 | 52.31 |
| ARC LENGTH OF CUT - "a" = W/cosB (INCHES) | | 13.901 | 13.901 | 13.901 | 13.901 |
| DISC SPEED "R" = V*12/(L*N) (rpm) | | 36.36 | 72.73 | 109.09 | 145.45 |
| INCREMENTS PER CUT "i" = L/I | | 1 | 1 | 1 | 1 |
| DIAMETER OF DISC "D" = I*a*N/Pi (INCHES) | | 13.27 | 13.27 | 13.27 | 13.27 |
| TIP SPEED OF DISC "T" = D*R*Pi/12 (fpm) | | 126.38 | 252.75 | 379.13 | 505.51 |
| DEGREES OF DISC TRAVEL PER INCREMENT - "d" (DEGREES) | | 120.00 | 120.00 | 120.00 | 120.00 |

CROSS DIRECTION WEB PROCESSOR

BACKGROUND OF THE INVENTION

1. Field of the Invention

The present invention relates to a cross direction web processor for cutting, perforating or scoring a moving web perpendicular to the path in which the web is moving.

2. Description of the Background Art

Web processors which perform slitting or perforating operations on a moving web are known in the art. However, in the prior art devices, the perforating or slitting operation is performed parallel to the direction of travel of the moving web. An example of such a device is shown in U.S. Pat. No. 4,569,359, wherein a laser is used to produce a row of fine perforations along a direction of web travel. Other devices, such as U.S. Pat. No. 3,226,527, have been developed in which a laser is transversely moved across a stationary web in order to cut the web or produce a series of perforations therealong.

Mechanical devices such as sheeters and perforators are presently available which can perform cross direction operations on a moving web. However, these devices are subject to wear with a consequential degradation in performance. Therefore, a need exists in the art for an improved device which can cut, perforate or score a moving web in a direction perpendicular to the path in which the web is moving.

SUMMARY OF THE INVENTION

Accordingly, it is a primary object of the present invention to provide a web processor for performing cross-direction operations on a moving web of material, such as paper. The operations may include scoring, marking, perforating or cutting of the web.

A further object of the present invention is to provide a web processor which scores, marks, perforates or cuts a moving web in a direction perpendicular to the direction in which the web is moving.

Another object of the present invention is to provide a method for performing the cross-direction operations on a moving web of material.

Yet another object of the present invention is to produce a finished product upon which a cross-direction operation has been performed.

Still yet another object of the present invention is to produce a perforated sheet in which individual paper fiber strands bridge the perforated areas, resulting in improved strength of the sheet in the machine direction. This allows the sheet to pass properly through another machine such as a printing press.

These and other objects of the present invention are fulfilled by a web processor including support means for supporting a movable web to form a concave trough along a path having a longitudinal axis. A rotatable element rotatable about an axis of rotation is provided which includes beam redirecting means for redirecting an incident beam of radiation which is substantially coincident with the axis of rotation to produce a resultant beam, the resultant beam being directed substantially orthogonally to the axis of rotation. The rotatable element further includes means for focussing the resultant beam to produce a focus point on the path. The path is configured such that rotation of the rotatable element locates the focus point on a line non-parallel to the longitudinal axis of the concave trough.

The above objects of the present invention are further fulfilled by a method for treating a web. In the method, a movable web is formed into a concave trough having a longitudinal axis, and a rotatable element is rotated about an axis of rotation. An incident beam of radiation is produced and directed to beam redirecting means to produce a resultant beam of radiation. The resultant beam of radiation is directed substantially orthogonally to the axis of rotation, and focussed to produce a focus point on the concave trough. The web is moved in a direction along the longitudinal axis while rotating the rotatable element to locate the focus point on a line across the web, with a path of travel of the focus point being non-parallel to the longitudinal axis of the concave trough.

Finally, the above objects of the present invention are further fulfilled by a web which has been scored, marked, perforated or cut by the above method.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 6 is a diagram showing the relationship between the circular disk and the focal point;

FIG. 9 is a chart corresponding to one lens and a mounted angle of 6.71°;

FIG. 10 is a chart corresponding to three lenses and a mounted angle of 6.71°;

FIG. 11 is a chart corresponding to two lenses and a mounted angle of 6.71°;

FIG. 12 is a chart corresponding to one lens and a mounted angle of 23.33°;

FIG. 13 is a chart corresponding to one lens and a mounted angle of 52.31°; and

FIG. 14 is a chart corresponding to three lenses and a mounted angle of 52.31°.

DETAILED DESCRIPTION OF THE PREFERRED EMBODIMENTS

Figure 1:
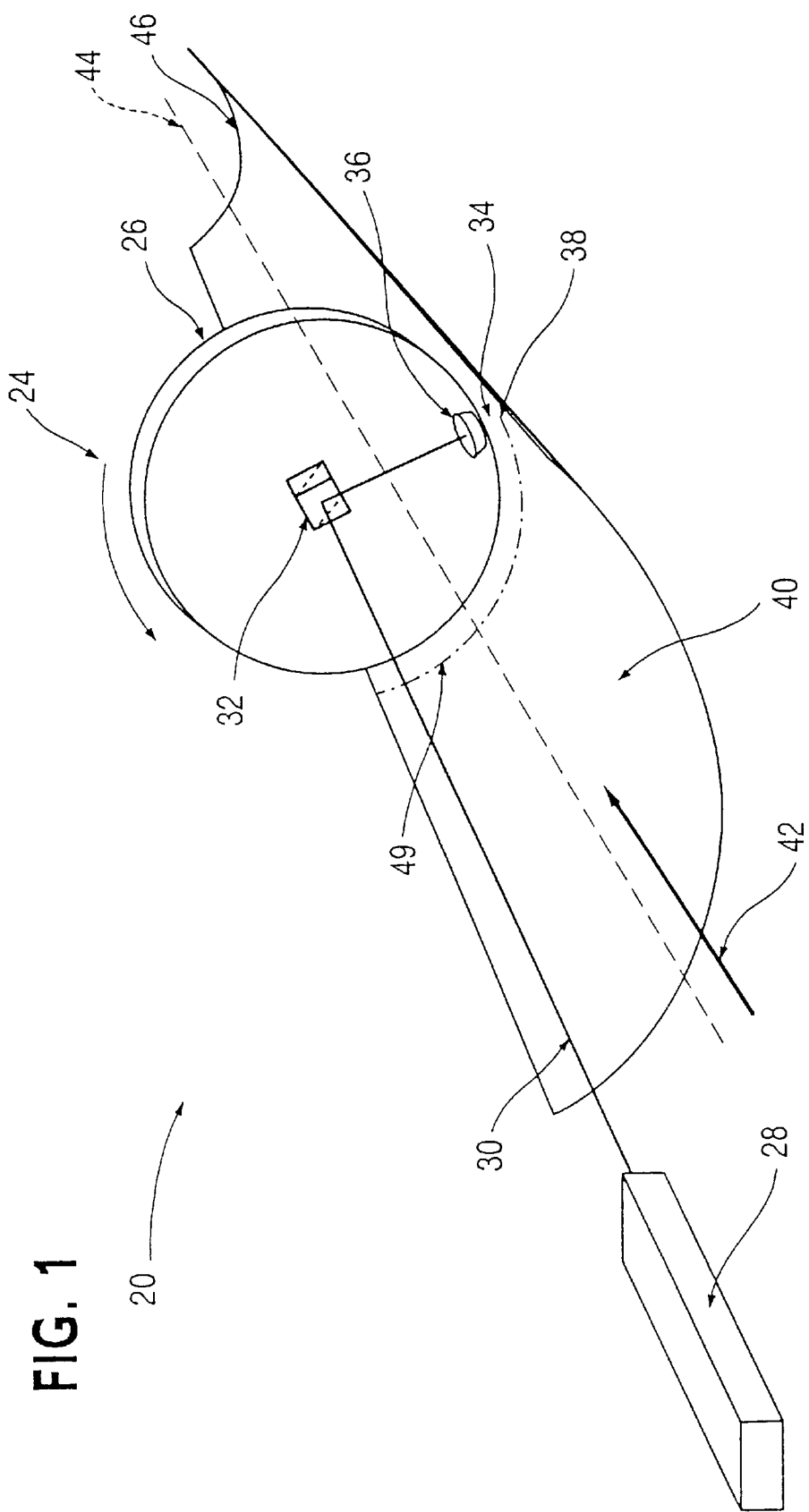
FIG. 1 is a perspective schematic view showing the relationship between the concave trough and the rotatable element.
Figure 5A:
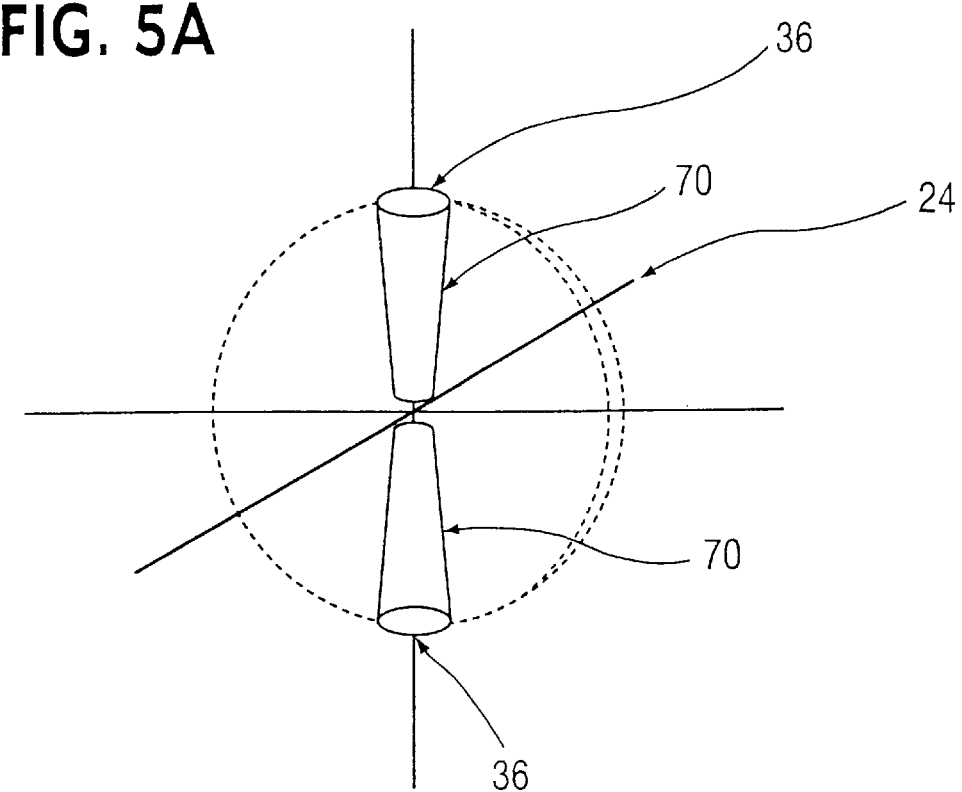
FIGS. 5A and 5B are schematic representations of the hollow tubular arm members with two and three tubular arm members being shown, respectively.
Figure 5B:
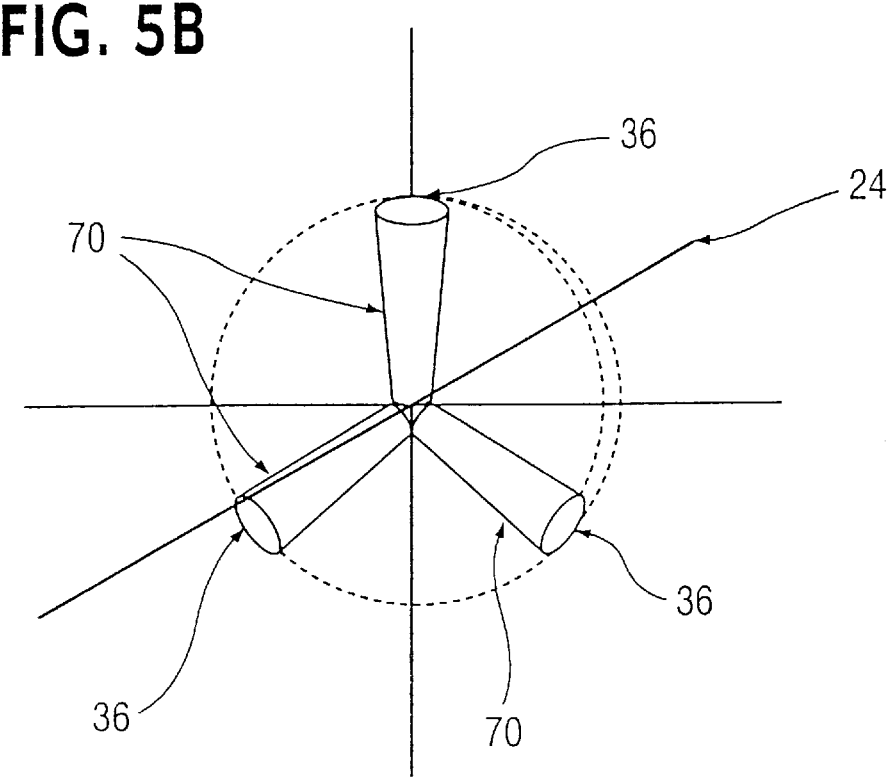

Referring in detail to the drawings and with particular reference to FIG. 1, a web processor 20 of the present invention is schematically shown. The web processor 20 includes a rotatable element 22 which is rotatable about an axis of rotation 24. The rotatable element 22 may be configured as a substantially circular rotatable disk 26, or as several arms in a plane uniformly spread around the axis of rotation 24, as shown in FIGS. 5a and 5b. A laser 28 is configured to emit a beam of incident radiation along an axis coincident with the axis of rotation 24. The beam of incident radiation 30 is redirected radially of the rotatable disk 26 by a beam redirecting element 32 located along the axis of rotation 24 of the rotatable element 22. The beam redirecting element 32 may include a mirror, a prism, or any optical instrument capable of changing the direction of an incident beam of radiation. The resultant beam 34 is directed orthogonally, or radially, of the disk 26 and passes through a lens 36. Thereafter, the resultant beam 34 is focused to produce a focus point 38 (FIG. 6) which is located a small distance away from the lens 36 when viewed in the radial direction.

Figure 7:
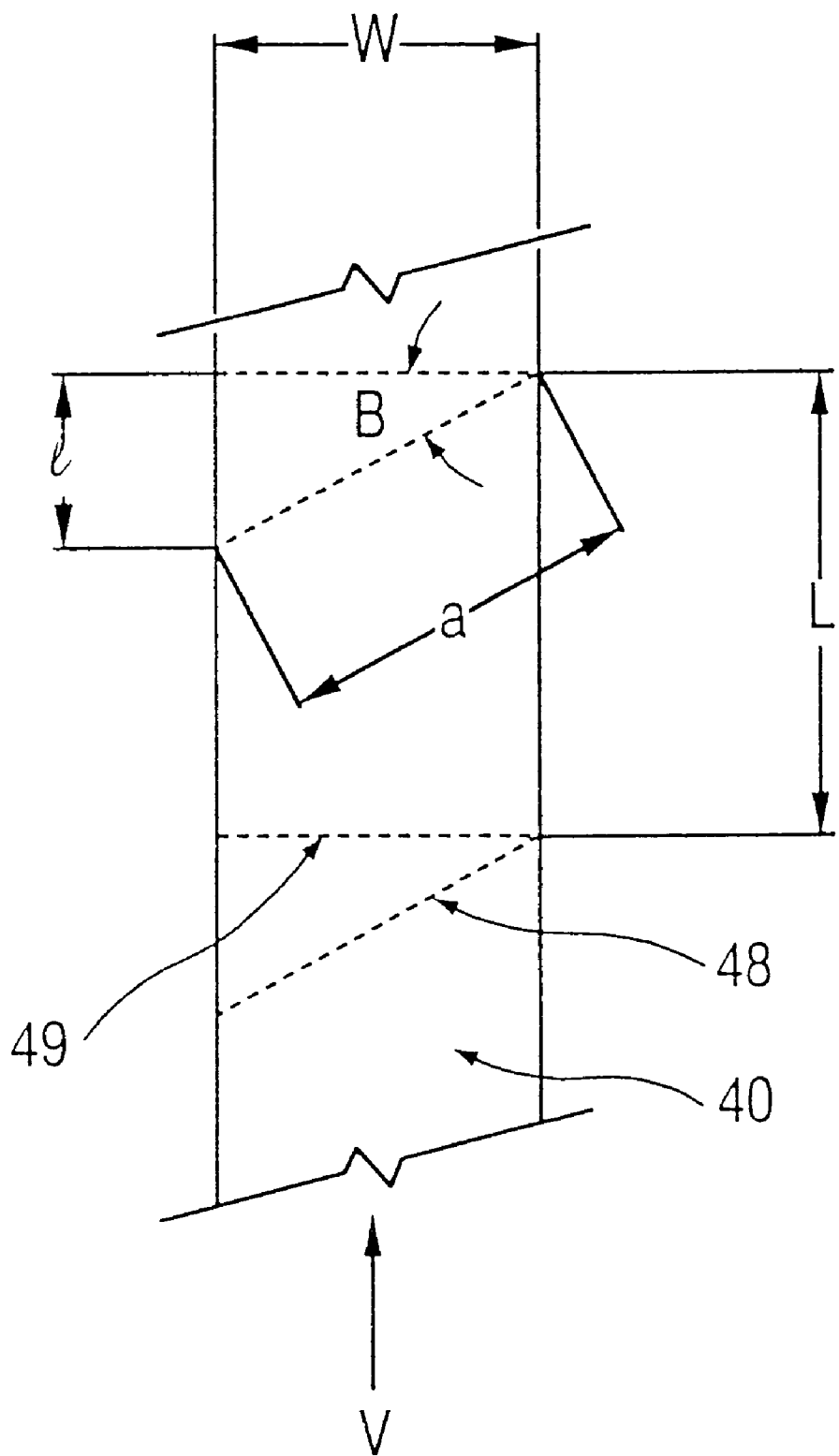
FIG. 7 is a plan view of the movable web.

A web 40 is supported for movement in a direction indicated by arrow 42 along a path having a longitudinal axis 44. The web 40 may be paper, film, fabric, or other material. The web 40 is supported so as to form a concave trough 46. The path of the moving web 40 is configured such that rotation of the rotatable element 22 locates the focus point 38 on a line 48 (see FIG. 7) non-parallel to the longitudinal axis 44 of the concave trough 46.

The path as used herein generally refers to the space through which the web passes as it travels in the longitudinal direction indicated by arrow 42. The path may assume a concave shape which is equivalent to the concave trough 46. The line 48 is non-parallel to the longitudinal axis 44 of the concave trough 46 because the axis of rotation 24 of the rotatable element 22 extends at an angle θ when viewed in plan view.

Figure 2A:
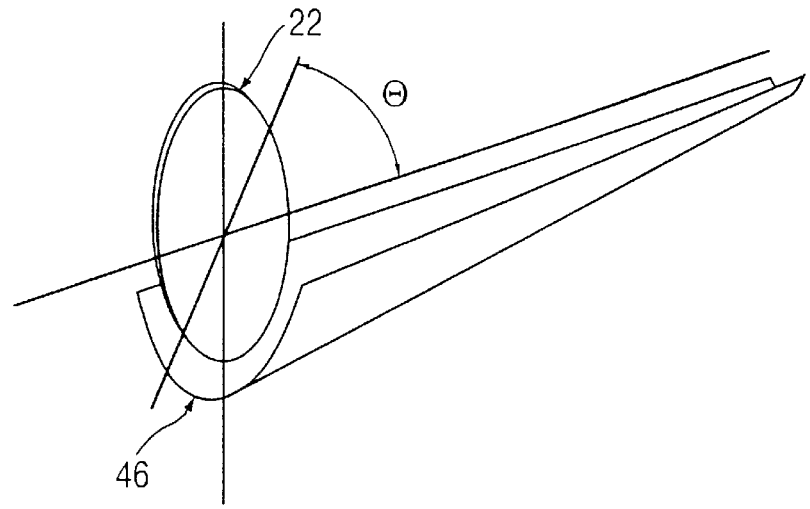
FIGS. 2A–2C are schematic perspective views showing the rotatable element oriented at various angles with respect to the longitudinal axis of the concave trough, with FIGS. 2A–2C showing a large angle, an intermediate angle, and a small angle, respectively.
Figure 2B:
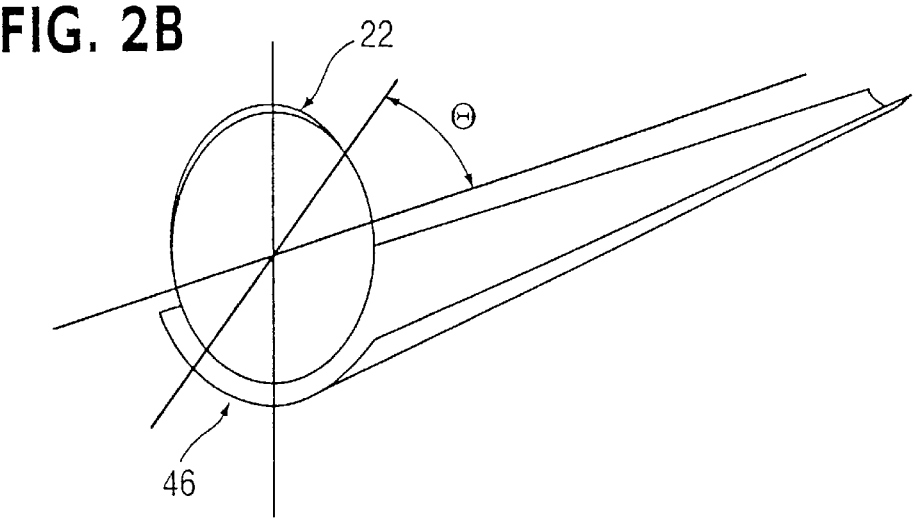
Figure 2C:
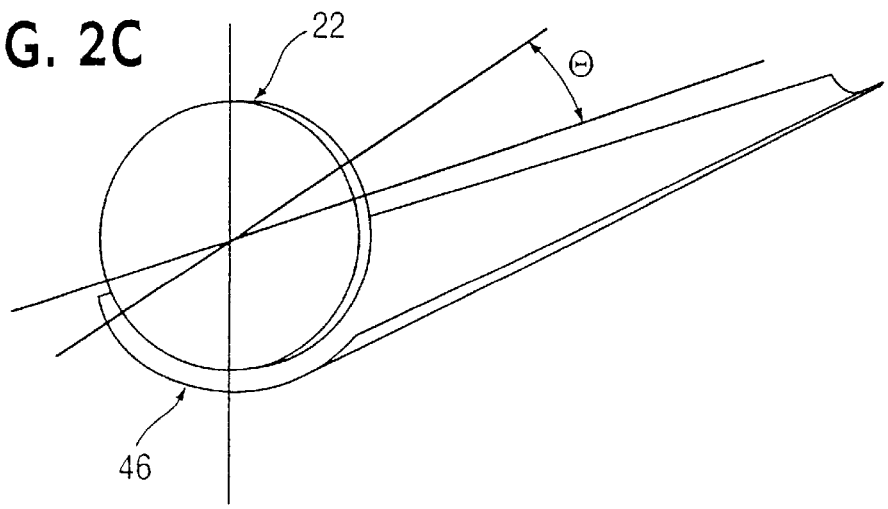

The angle θ of the rotatable element 22, may be large as shown in FIG. 2A, or may be small, as shown in FIG. 2C. The particular angle θ of the rotatable element 22 is a factor in determining the precise configuration of the concave trough 46. As shown in FIG. 2A, when the angle θ is large, the concave trough 46 becomes deeper and more pronounced. However, as the amount of angle decreases, as shown in FIGS. 2B and 2C, the concave trough 46 becomes flatter and less pronounced.

The movable web 40 is formed into the concave trough 46 by support means 50. The support means 50 may include upper and lower spaced-apart curved members 52 and 54, with the path of the moving web 40 being located therebetween. The upper curved member 52 and the lower curved member 54 form the movable web 40 into the concave trough 46. Either of the upper and lower curved members 52 and 54 may additionally include a roller 56, or a plurality of rollers, in order to assist movement of the movable web therealong.

Figure 3A:
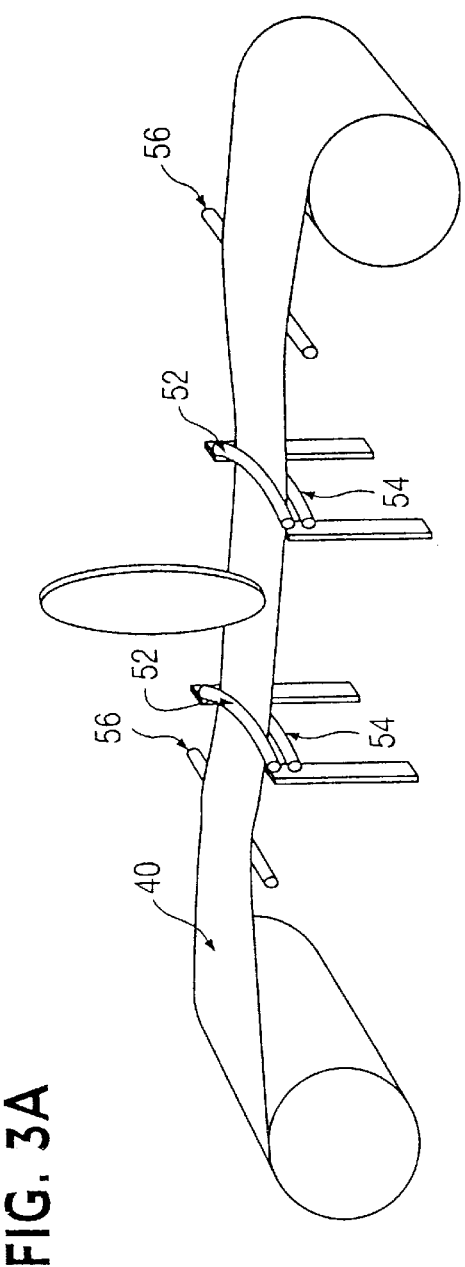
FIG. 3A is a perspective view showing a movable web passing through upper and lower curved members to form the concave trough.
Figure 3B:
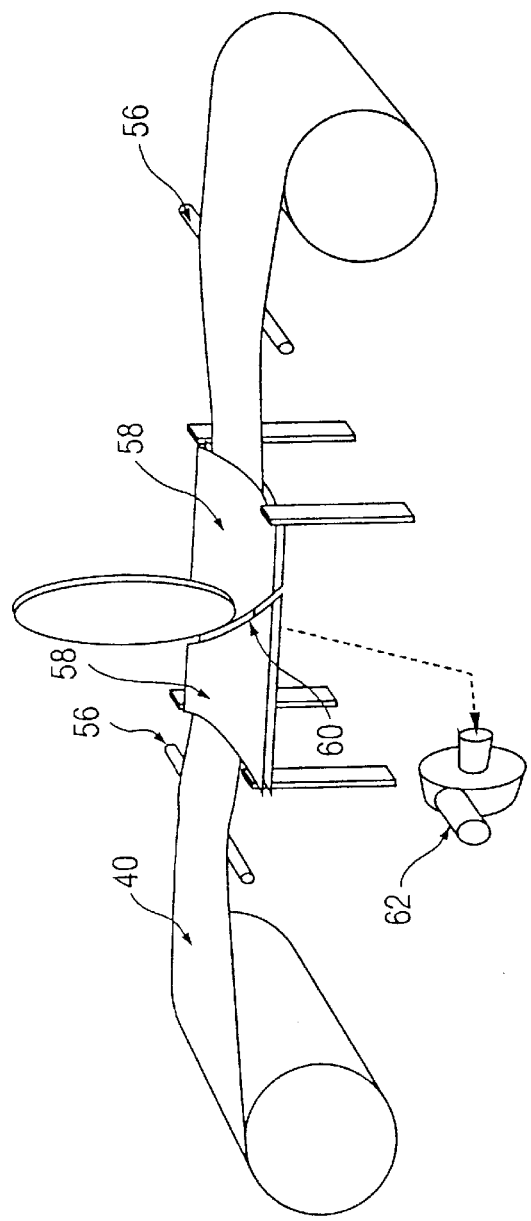
FIG. 3B is a perspective view showing the movable web passing over spaced-apart concave support surfaces to form the concave trough.

Alternatively, the support means 50 may include a stationary concave support surface 58, or a plurality of spaced apart stationary concave support surfaces 58, as shown in FIG. 3B. Each of these surfaces may include rollers or an air cushion to assist the movement of the web 40 thereover. A void space 60 may be formed between adjacent ones of the spaced-apart support surfaces 58. The void space 60 would be located under an area over which the focus point 38 passes so that the focus point 38 does not contact the concave support surface 58. Exhaust means 62 may be utilized to remove dust and vapors which are produced during cutting or perforating operations performed on the moving web 40.

The use of an upper curved member 52 is not always necessary. A vacuum applied through the lower member 54 or the support surface 58 could form the sheets into the desired shape.

The support means 50 may be configured to accommodate a single moveable web 40, or a plurality of moveable webs 40 placed side-by-side. Further, the support means 50 may be configured as a moving conveyor belt which supports the moveable web 40 thereon.

Figure 4A:
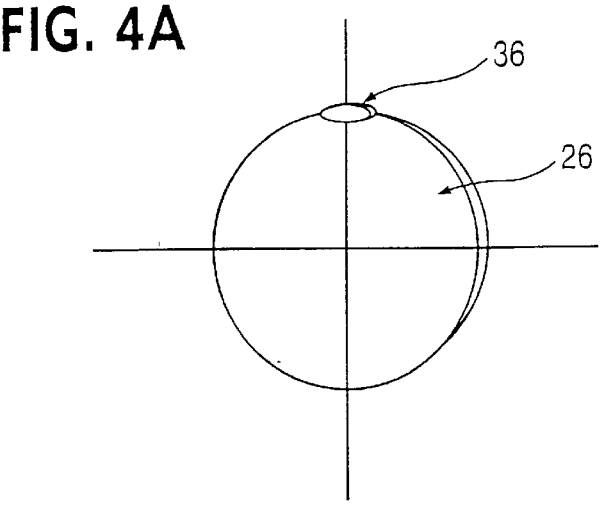
FIGS. 4A–4C schematically illustrate a rotatable circular disk having one, two and three lenses, respectively.
Figure 4B:
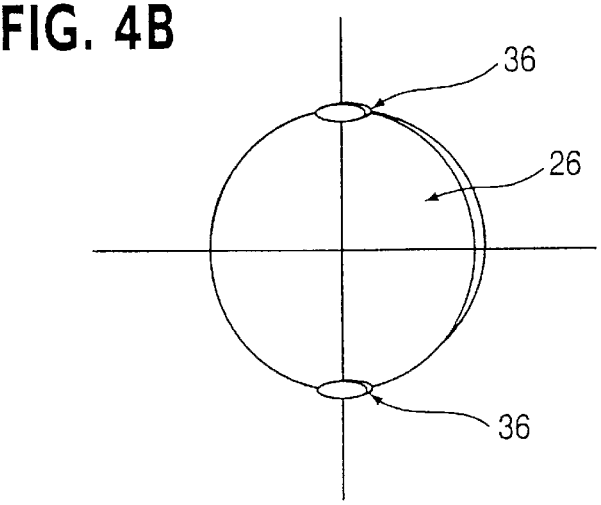
Figure 4C:
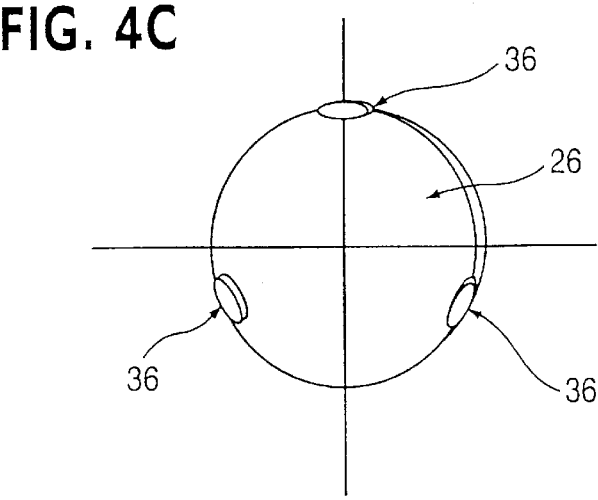

FIGS. 4A through 4C show various configurations of the circular rotatable disk 26. As shown in FIG. 4A, the rotatable disk 26 may include a single lens 36. However, two or three lenses 36 may be used, as shown in FIGS. 4B and 4C, respectively, depending on the operation which is to be performed on the movable web 40. Alternatively, the rotatable element 22 may be configured as a hollow tubular arm member 70 rotatable about an axis of rotation 24, as shown in FIGS. 5A and 5B. Each hollow tubular arm member 70 includes a lens 36, and which configuration of tubular arm member used will depend on the operation which is to be performed on the movable web 40. The resulting beam 34 passes through an interior of a particular hollow tubular arm member 70.

FIG. 6 shows the rotatable element 22 configured as a rotatable disk 26. The rotatable disk 26 includes two lenses 36 spaced at diametrically opposed circumferential portions of the rotatable disk 26. The focus point 38 is spaced radially from the lens 36 by a small amount, and this small amount is taken into account when calculating the diameter of the rotatable disk 26, which is discussed below.

FIGS. 7–14 will now be explained. The terminology used for this explanation of the Cross Direction Web Processor, or Laser Cross Processor, includes the following:

The process or "cut" is the cutting, scoring, marking, or perforating utilizing a focused laser beam in the direction perpendicular to the direction of travel of the material being processed.

The rotating element refers to the component of the Laser Cross Processor that will rotate above the material being processed to direct and focus the laser beam. The rotating element will house directional mirror(s), focusing lenses, and axial stabilizing components. The rotating element could be of various configurations such as a disc, a ring, or a series of tubes.

The material being processed refers to the paper, carbonless paper, film, plastic, wood metal, etc., that is being processed by the above mentioned equipment.

The cycle is the interval of the repeated process mentioned above.

The calculations for the cross-direction web processor include variables which are referred to in FIGS. 7 and 9–14, and discussed in detail below.

The targets for defining a device such as a Laser Cross Processor would start with the following variables:

"V"—The line speed of the material being processed. (feet per minute—fpm) This would be defined to determine practical production rates.

"L"—The length of the material between cycles of the process (ex: distance between cuts—inches) This would be defined by the product requirements.

"W"—The width of the process (ex: Length of cross cut, Length of perforation, etc.) (inches) This would be defined by the product requirements.

"N"—The number of lenses mounted on the Laser Cross Processor rotating elements (disc, tube(s), etc.) This would be a necessary variable to reduce the rotational speed of the Laser Cross Processor's rotating element.

"II"—Increments per Cycle is an integer greater than or equal to 2 used to help define the diameter of the rotating element (D).

This is the number of arc lengths "a" that used with the number of lenses defines the rotational diameter of the Laser Cross Processor's rotating element. For example: "I"=2 refers to the condition where the arc length of "cut" is ½ the circumference of the rotational diameter of the rotating element. i.e., $D=(I*a*N)/\pi$. The higher the number, the larger the rotation diameter of the rotating element.

"I"—Increments per Cycle is also used to define the Incremental length of material travel (l), where l=L/I. (ex: when "I"=3, l=L/3)

The variables related to the design of the Laser Cross Processor would include the following:

"R"—Rotational speed of the rotating element. (revolutions per minute—rpm)

$$R=V*12/(L*N)$$

"T"—Tip Speed of the rotating element (feet per minute—fpm). This would be the velocity of the point of focus of the laser beam. This is also the rate of material cut relative to the point of focus of the laser beam as the velocity vector of the tip speed is equal to the velocity of the target line speed of the material being processed.

$$T=\pi(D/12)*R$$

"l"—Incremental length of material travel is the travel length of the material being processed during the "cutting" portion of the process cycle. (inches).

$$l=L/I$$

"B"—Mounted angle of the rotating element from the perpendicular of the material flow. (degrees)

$$B=\arctan(l/W)$$

"a"—Arc length traveled by the rotating element during the "cutting" portion of the process cycle. (inches)

$$a=(W^2+l^2)^{1/1}$$

"D"—Diameter of the rotating element of the Laser Cross Processor plus twice the focal length of the laser focusing lens(s). (inches)

$$D=I*a*N)/\pi$$

As used herein, the diameter of the rotating element incorporates the radial dimension from the lens 36 to the focus point 38, as shown in FIG. 6.

"d"—Rotation angle of rotating element per Increment (Degrees). This is the number of degrees of rotation traveled by the rotating element during the cut cycle.

$$d=360/(I*N)$$

The design of this equipment would begin with estimates such as the following:
Target Line Speed—"V"=300 fpm
Target Length—"L"=11 inches
Target Width—"W"=8.5 inches
Number of Lenses—"N"—1 lens
Increments per cycle—"I"=2 increments The rotational speed of the rotating element (R) would be calculated using the target material speed (V), the target length of the material between cycles (L), and the number of lenses utilized on the rotating element (N): $R=V*12/L*N)$.

ex: where $V = 300$ fpm $R = (300 \text{ fpm} * 12)/(11 \text{ inches} * 1 \text{ lens})$ $= 327$ rpm ex: where $V = 600$ fpm:

$R = (600 \text{ fpm} * 12)/(11 \text{ inches} * 1 \text{ lens})$ $= 654$ rpm

The tip speed of the rotating element (T) would be calculated using the target diameter of the rotating element (D) and its rotational speed (R): $T=\pi*D*R$ ex: where $R = 327$ rpm $T = 3.14 * (24 \text{ inches}/12) * 327 \text{ RPM}$ $= 2054$ fpm ex: where $R = 654$ rpm $T = 4107$ fpm The incremental length of travel (l) is calculated using the increments per cut (I) and the target length of material (L): t=L/I ex: where $L = 11$ inches and $I = 2$ increments $l = 11$ inches/2 increments per cut $l = 5 \ 1/2$ inches ex: where $L = 11$ inches and $I = 11$ inches $l = 11$ inches/11 increments per cut $= 1$ inch The mounted angle of the rotating element (B) would be calculated by using the incremental length of travel (l) and the target width of the process (W): B=arctan(l/W)

ex: where $l = 1$ inch and $W = 8 \ 1/2$ inches

-continued $$B = \arctan(1 \div 8.5)$$
$$= 6.71°$$

The arc length traveled by the rotating element (a) is equal to the path length of the "cut" on the material being processed. This is calculated by the incremental length of travel (l) and the target width of the process (W): $a=(l^2+W^2)^{1/2}$ ex: where $l = 1$ inch and $W = 8\ 1/2$ inches $$a = [(1)^2 * (8.5)^2]^{1/2}$$
$$= (73.25)^{1/2}$$
$$= 8.56 \text{ inches}$$

ex: where $l = 2$ inch and $W = 8.5$ inches $$a = [(2)^2 * (8.5)^2]^{1/2}$$
$$= (76.25)^{1/2}$$
$$= 8.73 \text{ inches}$$

The Diameter of the rotating element (D) is calculated by using the increments per cut (I), the arc length (A) and the number of lenses mounted on the rotating element (N): $D=(I*a*N)/\pi$ (this is the actual rotational diameter plus twice the focal length).

ex: where $I = 11$ inches, $a = 2$ inches, and $N = 1$ $$D = (11 * 8.73 * 1)/3.14$$
$$= 30.58 \text{ inches}$$

The Rotational angle per increment of the rotating element (d) is calculated by using the increments per cycle (I), and the number of lenses mounted on the rotating element (N): $d=360/(I*N)$ ex: where I=11 increments and N=1 d=360/(11*1)

=32.73 degrees

Figure 8A:
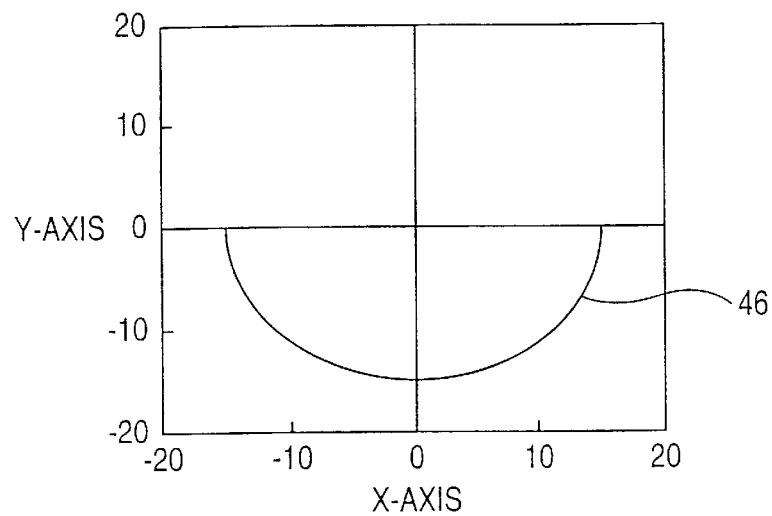
FIGS. 8A–8C are graphical representations of three trough configurations, with FIGS. 8A–8C showing trough configurations corresponding to a small, an intermediate, and a large mounting angle of the rotatable element, respectively.
Figure 8B:
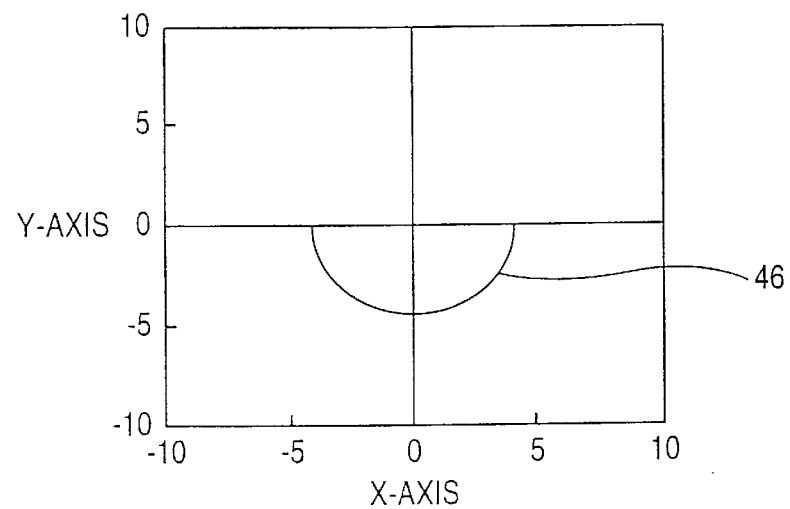
Figure 8C:
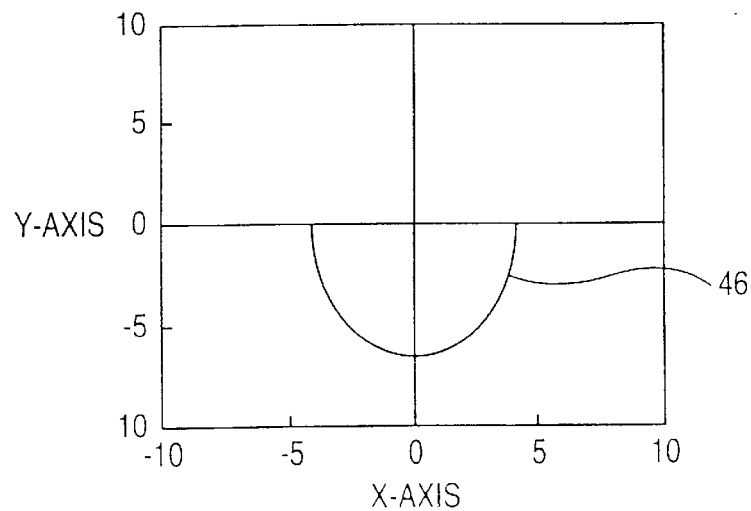

FIGS. 8A through 8C are graphical representations of three trough configurations. FIG. 8A shows a concave trough 46 which corresponds to the values set forth in FIG. 9. FIG. 8B shows a concave trough 46 corresponding to the values set forth in FIG. 12. Finally, FIG. 8C shows a concave trough 46 which corresponds to the values set forth in FIG. 14. It should be noted that the variable "D" referring to the diameter of the disk actually refers to the diameter of the "focus point disk", which is shown in FIG. 6.

The values X and Y as shown in FIGS. 8A through 8C are coordinate points on a locus of points along an ellipse corresponding to the formula $(X^2/A^2)$ plus $(Y^2/B^2)$ equals 1, where "A" is equal to one-half of a major axis length of the ellipse and "B" is a equal to one-half of a minor axis length of the ellipse.

The operation of the cross-direction web processor will now be described in detail. As the web 40 is moved along the longitudinal axis 44 in the direction 42, a laser 28 directs an incident beam of radiation 30 onto the beam redirecting element 32 to be redirected to the lens 36. The resultant beam is focused onto the moving web and is moved on a line non-parallel to the longitudinal axis of the concave trough 46. The direction of rotation of the rotatable element 22 is at a precise angle to the direction of web travel such that the advance in web travel and the rotation of the rotatable element locate a line non-parallel to the longitudinal axis of the concave trough. The resulting line 49 on the web may ideally be directed perpendicularly to the longitudinal axis of the concave trough.

The web processor may be configured to produce a score, a mark, a plurality of spaced-apart perforations, or a complete cut along this line. A score is the breaking of material fibers so that a line is formed along which the material may be conveniently folded. A laser scoring operation is performed by cutting the material to a predetermined partial depth. Perforating refers to the producing of holes in a pattern having a particular length, width and spacing. Perforating is performed by pulsing the laser to produce the desired perforation pattern.

The rotational speed of the rotatable element 22 may vary during its rotation such that the rotational speed decreases as the focus point 38 at least initially travels along the path, and increases after reaching the major axis point at the center of the web 40. This change in rotational speed compensates for the relative speed between the rotatable element 22 and the moving web 40 so as to produce a more straight cut or perforation along the line.

The beam redirecting means may be independently movable with respect to the rotatable element 22. For example, the beam redirecting means 32 may be configured to oscillate as the rotatable element 22 performs a complete 360° revolution. It is only necessary that the beam redirecting element be aligned with the element 22 prior to the focus point 38 initially travelling along the path. This is especially the case where two or more lenses 36 are used so that a single beam redirecting element 32 may be utilized to direct the resultant beam 34 alternatively to each of the plurality of lenses 36.

Alternatively, a single beam redirecting element may be used which splits the beam of incident radiation 30 into a plurality of resultant beams 34 which are directed to a corresponding number of lenses 36. However, this particular method is less desirable due to the increased power requirement placed on the laser 28. For example, if a beam redirecting element 32 were utilized which split the beam of incident radiation 30 into three resultant beams 34 which were directed to three separate lenses 36, the power requirements placed on the laser would approximately triple.

Additionally, it is possible for the beam redirecting element 32 and the lens 36 to oscillate together through a circular arc which travels back and forth across the concave trough 46. The laser 28 may be energized as the beam redirecting element 32 and lens 36 travel in a first direction across the concave trough 36, and may be turned off as the beam redirecting element 32 and the lens 36 travel back to the initial position. Also, the beam redirecting element 32 and the lens 36 may be stationary in order to perform a slitting operation along the axis of movement of the moveable web 40.

An electrical controller or a mechanical shutter may be utilized to switch the beam of incident radiation 30 on and off to produce the desired effect on the movable web 40. Power supply modulation may also be utilized to produce the desired pulsing characteristics.

Any suitable laser 28 may be utilized depending on the characteristics of the web material and the desired operation performed on the selected material. In the present invention, a carbon dioxide ($CO_2$) laser is preferred.

A laser possesses several important advantages over mechanical cutting and perforating devices. For example, because there is no contact between the laser output and the material, such as paper, there is no tool wear normally associated with mechanical cutting blades. Because very high power and small spot size produce power densities sufficient to vaporize the material, the result is edge quality superior to fiber shearing or tearing actions. Further, dust is virtually eliminated. Finally, the fibers adjacent to the cut area may be fused by the laser, providing greater strength along the edge of the cut sheet.

Because there is no contact between the material and the cutting device, there is no contamination of the material such as might occur by metal particles from a mechanical cutting blade. Further, because there is no blade per se, the laser may be used to perform operations on materials containing adhesives which would normally buildup on the mechanical blades over time.

It should be noted that the web processor of the present invention can be utilized to cut various types of material including paper, abrasives, adhesive-backed materials, thin veneers made of wood, plastic, etc., or films. Further, the web processor may be utilized to cut multiple sheets stacked one atop the other and moving together, such as multipart carbonless paper.

A method for treating a web 40 includes the steps of forming a movable web into a concave trough 46 having a longitudinal axis 44, rotating a rotatable element 22 about an axis of rotation 24, producing an incident beam of radiation 30 and directing the incident beam of radiation 30 to a beam redirecting element 32 to produce a resultant beam of radiation 34, directing the resultant beam of radiation 34 substantially orthogonally to the axis of rotation 24, focusing the resultant beam 34 with a lens 36 to produce a focus point 38 on the concave trough 46, and moving the web 40 in a direction 42 along the longitudinal axis 44 while rotating the rotatable element 22 to locate the focus point 38 on a line across the web 40, a path of travel of the focus point 38 being non-parallel to the longitudinal axis 44 of the concave trough 46.

The method of treating a web 40 may further include the step of oscillating the beam redirecting element 32 and the lens 36 back and forth through a circular arc.

The method may include the step of varying a rotational speed of the rotatable element 22 during rotation of the rotatable element 22 such that the rotational speed of the rotatable element 22 decreases as the focus point 38 at least initially travels along the path.

The method of treating a web may include the step of using a plurality of lenses 36 to focus the resultant beam 34 to produce the focus point 38, with the plurality of lenses 38 being a part of the rotatable element 22 and being rotatable therewith. The beam redirecting element 32 is then oscillated as the plurality of lenses 36 continuously rotate in one direction to thereby direct the resultant beam 34 alternately to each of the plurality of lenses 36.

The method of treating a web may be used to perform a plurality of different operations along the line on the movable web 40. For example, any one or more of a score, a mark, a plurality of spaced-apart perforations, or a complete cut may be produced by the cross-direction web processor.

A web 40 which has been treated by the above method is also the subject of the present invention. The web 40 may have been processed to include any one or more of a score, a mark, a plurality of spaced-apart perforations, or a complete cut.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A web processor comprising:
   a support for supporting a movable web to form a concave trough along a path having a longitudinal axis; and
   a rotatable element rotatable about an axis of rotation, the rotatable element including
      a beam redirecting device for redirecting an incident beam of radiation which is substantially coincident with the axis of rotation to produce a resultant beam, the resultant beam being directed substantially orthogonally to the axis of rotation, and
      a focusing device for focussing the resultant beam to produce a focus point on the path,
   whereby the path is configured such that rotation of the rotatable element locates the focus point on a line on the concave trough, said line being non-parallel to the longitudinal axis of the concave trough.

2. The web processor as set forth in claim 1, wherein the support includes a stationary concave support surface which forms the movable web into the concave trough.

3. The web processor as set forth in claim 1, wherein the support includes a plurality of spaced-apart stationary concave support surfaces which form the movable web into the concave trough.

4. The web processor as set forth in claim 3, wherein a void space is formed between adjacent ones of the spaced-apart support surfaces, and further including an exhaust apparatus for removing dust entering the void space.

5. The web processor as set forth in claim 1, wherein the support includes upper and lower spaced-apart curved members, with the path being therebetween, both of the upper and lower curved members forming the movable web into the concave trough.

6. The web processor as set forth in claim 1, wherein the support includes at least one roller which forms the movable web into the concave trough.

7. The web processor as set forth in claim 1, wherein the path is shaped as a portion of an ellipse according to the following formula:

$$(x^2/a^2)+(y^2/b^2)=1,$$

where
   a is equal to one half of a major axis length of the ellipse,
   b is equal to one half of a minor axis length of the ellipse, and
   x and y are coordinate points on a locus of points along the ellipse.

8. The web processor as set forth in claim 1, wherein a rotational speed of the rotatable element varies during rotation of the rotatable element such that the rotational speed of the rotatable element decreases as the focus point at least initially travels along the path and then increases after the focus point reaches the vicinity of the center of the movable web.

9. The web processor as set forth in claim 1, wherein the rotatable element includes at least one hollow tubular arm member, with the resultant beam passing through an interior of the hollow tubular arm member.

10. The web processor as set forth in claim 1, wherein the axis of rotation of the rotatable element is non-parallel to the longitudinal axis of the path.

11. The web processor as set forth in claim 1, wherein the rotatable element includes a substantially circular rotatable disk.

12. The web processor as set forth in claim 11, wherein the focussing device includes at least one lens mounted on the disk.

13. The web processor as set forth in claim 11, wherein the beam redirecting device is independently movable with respect to the rotatable disk.

14. The web processor as set forth in claim 1, wherein the beam redirecting device includes a mirror or prism.

15. The web processor as set forth in claim 1, wherein the focussing device includes a plurality of lenses, and wherein the beam redirecting device oscillates as the plurality of lenses continuously rotate in one direction to direct the resultant beam alternately to each of the plurality of lenses.

16. The web processor as set forth in claim 1, wherein the beam redirecting device and the focussing device oscillate through a circular arc.

17. The web processor as set forth in claim 1, wherein the focussing device includes a plurality of lenses each spaced from the axis of rotation by an approximately equal distance.

18. The web processor as set forth in claim 1, wherein the focussing device includes at least one lens, and wherein movement of the focus point along the web in the path produces at least one of a score, a mark, a plurality of spaced-apart perforations, or a complete cut along the line.

19. The web processor as set forth in claim 1, wherein the axis of rotation of the rotatable element is non-parallel to the longitudinal axis of the path, wherein the focussing device includes at least one lens, and wherein movement of the focus point along the web in the path produces at least one of a score, a mark, a plurality of spaced-apart perforations, or a complete cut along the line.

20. The web processor as set forth in claim 19, wherein the support includes a stationary concave support surface which forms the movable web into the concave trough.

21. The web processor as set forth in claim 20, wherein the rotatable element includes at least one hollow tubular arm member, with the resultant beam passing through an interior of the hollow tubular arm member.

22. The web processor as set forth in claim 20, wherein the beam redirecting device and the focussing device oscillate through a circular arc.

23. The web processor as set forth in claim 20, wherein the rotatable element includes a substantially circular rotatable disk.

24. The web processor as set forth in claim 23, wherein the beam redirecting device includes a mirror or a prism.

25. The web processor as set forth in claim 24, wherein the beam redirecting device is independently movable with respect to the rotatable disk.

26. The web processor as set forth in claim 25, wherein a rotational speed of the rotatable element varies during rotation of the rotatable element such that the rotational speed of the rotatable element decreases as the focus point at least initially travels along the path.

27. The web processor as set forth in claim 25, wherein the focussing device includes a plurality of lenses, and wherein the beam redirecting device oscillates as the plurality of lenses continuously rotate in one direction to direct the resultant beam alternately to each of the plurality of lenses.

28. The web processor as set forth in claim 1, wherein an area beneath said concave trough at said line is free of supporting members.

29. The web processor as set forth in claim 1, where an area beneath said concave trough and said rotatable element is free of supporting rollers.

30. The web processor as set forth in claim 1, wherein said movable web is freely suspended directly below said rotatable element.

31. A method for treating a web comprising the following steps:

forming a movable web into a concave trough having a longitudinal axis;

rotating a rotatable element about an axis of rotation;

producing an incident beam of radiation;

directing the incident beam of radiation to a beam redirecting device to produce a resultant beam of radiation;

directing the resultant beam of radiation substantially orthogonally to the axis of rotation;

focussing the resultant beam to produce a focus point on the concave trough; and moving the web in a direction along the longitudinal axis while rotating the rotatable element to locate the focus point on a line across the web, a path of travel of the focus point being nonparallel to the longitudinal axis of the concave trough.

32. The method of treating a web as set forth in claim 31, and further including the step of oscillating the beam redirecting device back and forth through a circular arc.

33. The method of treating a web as set forth in claim 31, and further including the step of varying a rotational speed of the rotatable element during rotation of the rotatable element such that the rotational speed of the rotatable element decreases as the focus point at least initially travels along the path and then increases after the focus point reaches the vicinity of the center of the movable web.

34. The method of treating a web as set forth in claim 31; and further including the steps of:

using a plurality of lenses during the step of focussing to thereby focus the resultant beam to produce the focus point, the plurality of lenses being a part of the rotatable element and being rotatable therewith; and oscillating the beam redirecting device as the plurality of lenses continuously rotate in one direction to direct the resultant beam alternately to each of the plurality of lenses.

35. The method of treating a web as set forth in claim 31, and further including the step of producing at least one of a score, a mark, a plurality of spaced-apart perforations, or a complete cut along the line.

36. A web treated by the method as set forth in claim 35.

* * * * *